(12) United States Patent
Bossard et al.

(10) Patent No.: US 11,381,428 B2
(45) Date of Patent: Jul. 5, 2022

(54) DEVICE AND METHOD FOR DETERMINING OPTIMAL EQUALIZER SETTINGS FOR AN EQUALIZER FOR EQUALIZING A PULSE AMPLITUDE MODULATION SIGNAL

(71) Applicant: Tetra Semiconductors AG, Zürich (CH)

(72) Inventors: Martin Bossard, Zürich (CH); Jörg Wieland, Küsnacht (CH); Denis Müller, Neuenhof (CH)

(73) Assignee: TETRA SEMICONDUCTORS AG, Zürich (CH)

( * ) Notice: Subject to any disclaimer, the term of this patent is extended or adjusted under 35 U.S.C. 154(b) by 0 days.

(21) Appl. No.: 17/104,798

(22) Filed: Nov. 25, 2020

(65) Prior Publication Data
US 2022/0166654 A1    May 26, 2022

(51) Int. Cl.
*H04L 25/00* (2006.01)
*H04L 25/03* (2006.01)
*H04L 27/04* (2006.01)

(52) U.S. Cl.
CPC ........ *H04L 25/03885* (2013.01); *H04L 27/04* (2013.01)

(58) Field of Classification Search
CPC .............. H04L 25/03885; H04L 27/01; H04L 25/03267; H04L 27/04
USPC ................................ 375/229–233, 316, 350
See application file for complete search history.

(56) References Cited

U.S. PATENT DOCUMENTS

| | | | | |
|---|---|---|---|---|
| 9,397,824 | B1* | 7/2016 | Hoshyar | H04L 7/0331 |
| 2013/0142245 | A1* | 6/2013 | Sindalovsky | H04L 25/03057 |
| | | | | 375/233 |
| 2014/0169440 | A1* | 6/2014 | Kotagiri | H04L 25/063 |
| | | | | 375/233 |
| 2015/0188694 | A1* | 7/2015 | Kuan | H04L 7/0087 |
| | | | | 375/355 |
| 2015/0381393 | A1* | 12/2015 | Kotagiri | H04L 25/0292 |
| | | | | 375/233 |
| 2016/0006589 | A1* | 1/2016 | Kamali | H04L 25/03343 |
| | | | | 375/232 |

(Continued)

*Primary Examiner* — Emmanuel Bayard
(74) *Attorney, Agent, or Firm* — Knobbe, Martens, Olson & Bear, LLP

(57) ABSTRACT

A device (2) for determining optimal equalizer settings (setE_opt) for an equalizer (1) for equalizing a pulse amplitude modulation signal (L0, L1, L2, L3) comprises an estimator section (21) configured for receiving at least a part of the equalized pulse amplitude modulation signal (L0', L1', L2', L3') from the equalizer (1), and for receiving an offset signal (offS), and for generating an estimator signal (estS) indicative of a percentage of signal levels of the at least a part of the equalized pulse amplitude modulation signal (L0', L1', L2', L3') which are larger or smaller than the offset signal (offS). The device comprises a controller (22) configured for receiving the estimator signal (estS), and for generating the offset signal (offS), and for generating equalizer settings (setE) for the equalizer (1), wherein the controller (22) includes an optimizer (221) for determining the optimal equalizer settings (setE_opt) for the equalizer (1) by evaluating the estimator signal (estS) for a range of offset signals (o1, . . . o4) and for a range of equalizer settings (setE0, setE_opt, setE2).

18 Claims, 12 Drawing Sheets

(56) References Cited

U.S. PATENT DOCUMENTS

2016/0134443 A1\* 5/2016 Berke ............... H04L 25/03885
375/232
2016/0352557 A1\* 12/2016 Liao .................... H04L 27/3809
2018/0278405 A1\* 9/2018 Yao ....................... H04L 7/0334

\* cited by examiner

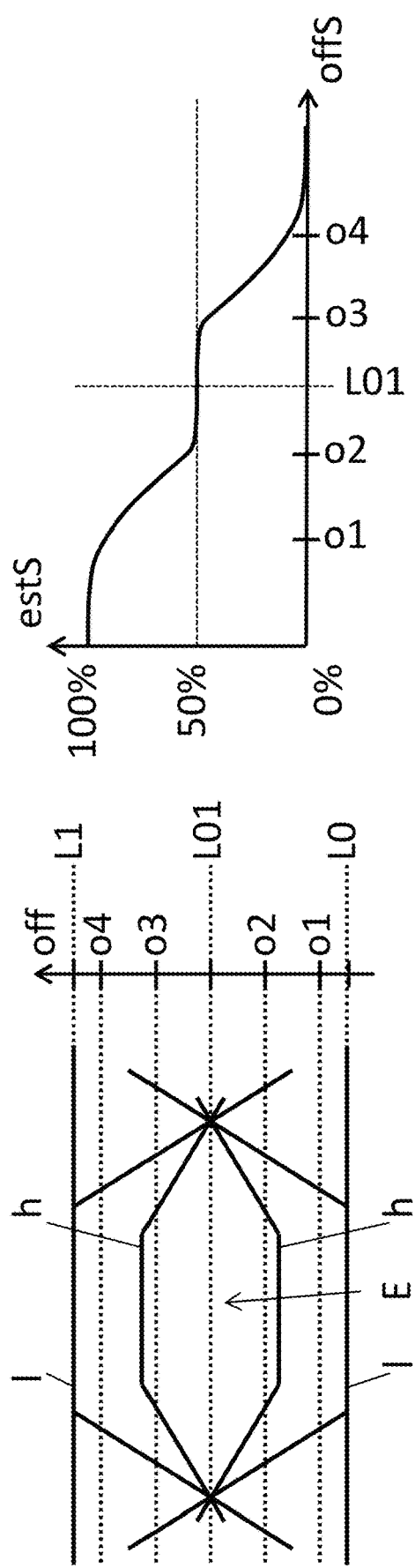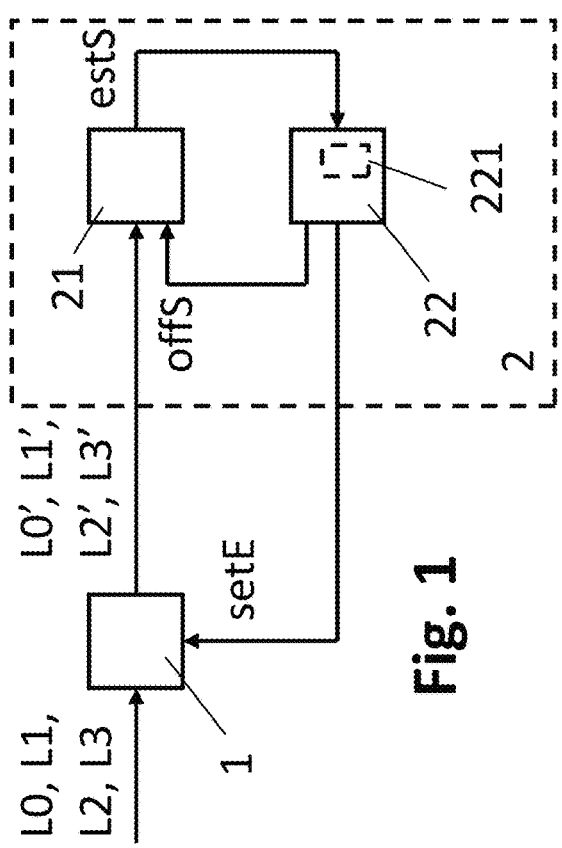
Fig. 1a
Fig. 1b
Fig. 1

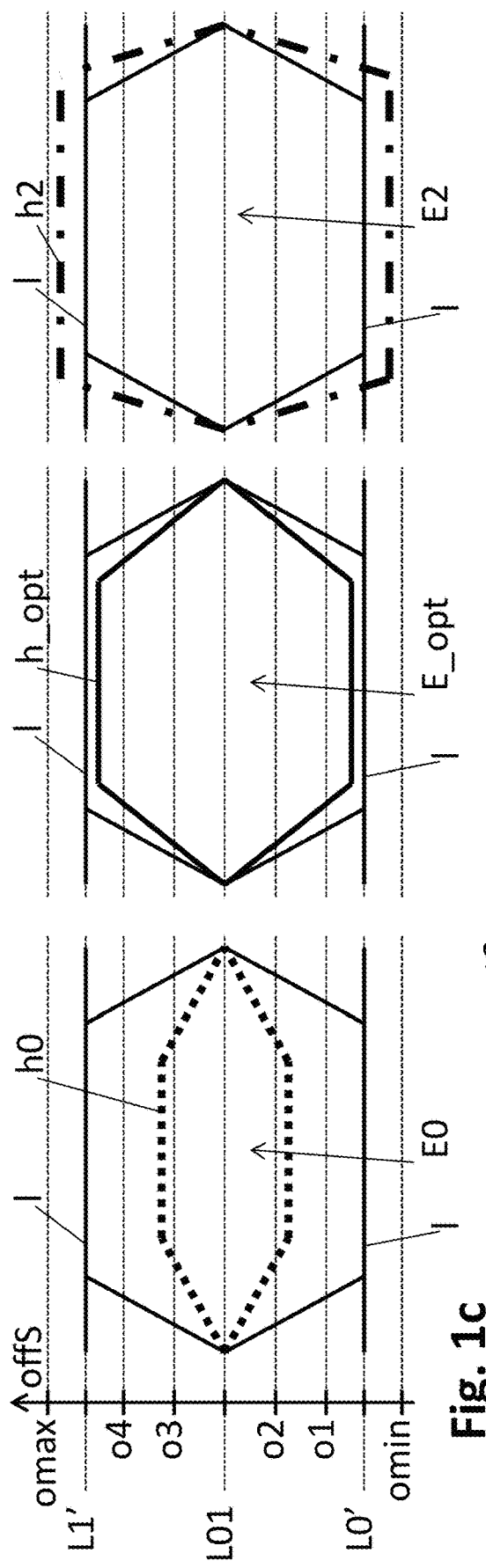
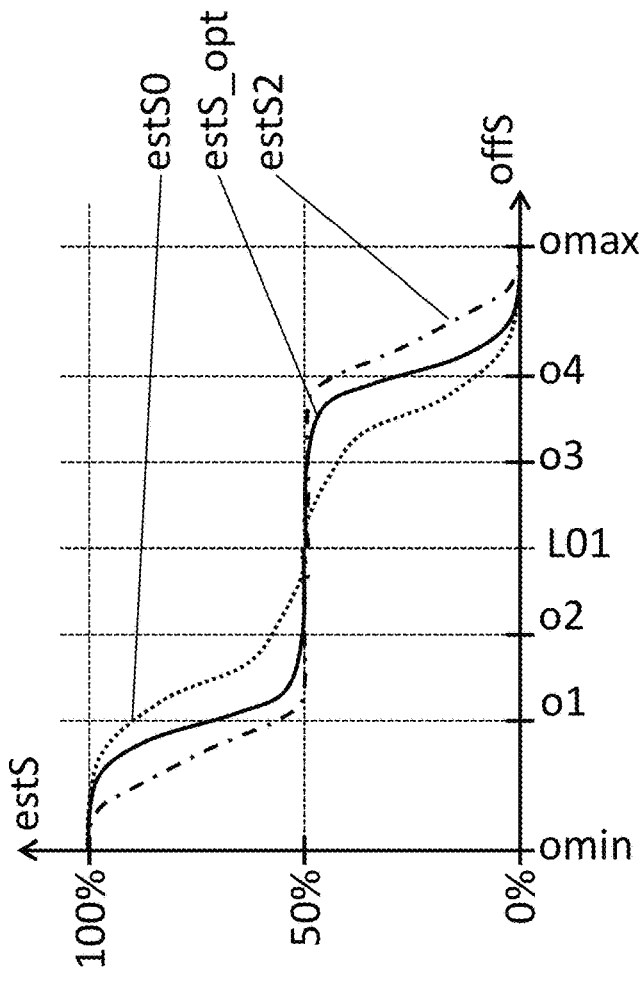
Fig. 1c
Fig. 1d

DEVICE AND METHOD FOR DETERMINING OPTIMAL EQUALIZER SETTINGS FOR AN EQUALIZER FOR EQUALIZING A PULSE AMPLITUDE MODULATION SIGNAL

FIELD OF THE INVENTION

The present invention relates to a device and a method for determining optimal equalizer settings for an equalizer for equalizing a pulse amplitude modulation signal.

BACKGROUND ART

In data transmission systems, a non-return-to zero (NRZ) signal enables encoding of data bit streams, wherein the ones of the bit stream are represented by one signal amplitude or signal level, such as a positive voltage, and the zeros of the bit stream are represented by another signal amplitude or signal level, such as a negative voltage. NRZ is a form of pulse amplitude modulation (PAM), where one bit at a time is mapped into two possible signal amplitudes. PAM-4 refers to a modulation where two bits at a time are mapped into four possible signal amplitudes. For a given baud rate, PAM-4 can transmit up to twice the number of bits as NRZ. PAM-8 refers to a modulation where three bits at a time are mapped into eight possible signal amplitudes, wherein for a given baud rate, PAM-8 can transmit up to three times the number of bits as NRZ. Other pulse amplitude modulation signals are possible, such as PAM-8, PAM-16, etc.

In particular because of low pass filter effects in data transmission systems, pulse amplitude modulation signals received at a receiver are low pass filtered and determining the data bit stream from the received pulse amplitude modulation signal may therefore be more difficult.

U.S. Pat. No. 6,865,223B1 discloses a receiver with an equalizer with plural equalizations settings, which compensates for distortion in a received signal, and an adapter for selecting one of those settings which optimally compensates for the distortion. The adapter employs a trial and error procedure for evaluating equalizer performance for each such setting by first observing multiple levels of the incoming signal and defining therefrom valid regions, encompassing each of the multiple levels, and invalid regions. For each setting, the adapter computes first and second metrics respectively consisting of a count of samples within each of the invalid regions, and differences that are less than a predetermined threshold between pairs of samples falling within that valid region. For each setting, the adapter combines the metrics to produce a combined metric. The adapter then compares all of the combined metrics to determine the best metric and chooses the setting corresponding thereto.

US20120201289A1 discloses a decision feedback equalizer and transceiver. The equalizer has at least one comparator, the at least one comparator comprising a first stage, comprising a main branch having two track switches with a resistive load, an offset cancellation branch, a plurality of tap branches with transistor sizes smaller than the main branch, in which previous decisions of the equalizer are mixed with the tap weights using current-mode switching, and a cross coupled latch branch; and a second stage, comprising a comparator module for making decisions based on the outputs of the first stage and a clock input, and a plurality of flip-flops for storing the output of the comparator module.

DISCLOSURE OF THE INVENTION

There may be a need for an improved device and a method for determining optimal equalizer settings for an equalizer for equalizing a pulse amplitude modulation signal. More particularly, there may be a need for a device and a method for determining optimal equalizer settings for an equalizer for equalizing a pulse amplitude modulation signal which are simple and low power. More particularly, there may be a need for a device and a method for determining optimal equalizer settings for an equalizer for equalizing a pulse amplitude modulation signal which are fast. More particularly, there may be a need for a device and a method for determining optimal equalizer settings for an equalizer for equalizing a pulse amplitude modulation signal which are adapted to various types of equalizers.

Such a need may be met with the subject-matter of the independent claims.

Advantageous embodiments are defined in the dependent claims.

Ideas underlying embodiments of the present invention may be interpreted as being based, inter alia, on the following observations and recognitions.

An aspect of the invention relates to a device for determining optimal equalizer settings for an equalizer for equalizing a pulse amplitude modulation signal, the device comprising an estimator section configured for receiving at least a part of the equalized pulse amplitude modulation signal from the equalizer, and for receiving an offset signal, and for generating an estimator signal indicative of a percentage of signal levels of the at least a part of the equalized pulse amplitude modulation signal which are larger or smaller than the offset signal. The device comprises a controller configured for receiving the estimator signal, and for generating the offset signal, and for generating equalizer settings for the equalizer, wherein the controller includes an optimizer for determining the optimal equalizer settings for the equalizer by evaluating the estimator signal for a range of offset signals and for a range of equalizer settings. By determining an estimator signal indicative of the percentage of signal levels which are larger or smaller than the offset signal, the eye opening of the pulse amplitude signal can be determined. By evaluating the estimator signal for various offset signals and equalizer settings, optimal equalizer settings can be determined.

According to an embodiment of the device, wherein the controller is configured for evaluating the estimator signal which includes determining for each member of a set of estimator signals a distance where the respective estimator signal is within a threshold window, and determining the longest distance for determining the optimal equalizer settings. By defining a threshold window and determining distances with respect to this threshold window, optimal equalizer settings can be determined in a simple manner.

According to an embodiment of the device, the estimator section includes a charge pump circuit for respectively charging and discharging a capacitor. A charge pump enables a simple circuit for generating an estimator signal indicative of a percentage of signal levels of the at least a part of the equalized pulse amplitude modulation signal which are larger or smaller than the offset signal.

According to an embodiment of the invention, the estimator section includes a comparator circuit for converting the estimator signal into one or more binary signals indicative of if the estimator signal is within a threshold window or not, wherein the controller is configured for receiving and evaluating the binary signals accordingly. Converting the estimator signal into one or more binary signals simplifies determining optimal equalizer settings by the controller.

According to an embodiment of the invention, the optimizer is configured for evaluating the one or more binary signals by applying one or more binary search algorithms. The optimal equalizer settings can be determined efficiently.

According to an embodiment of the invention, the controller is configured for generating equalizer settings for the equalizer which include one or more gains of one or more equalizer taps. The device can be adapted to various equalizer configurations.

According to an embodiment of the invention, the device includes one or more components which are arranged on an integrated circuit, in particular one or more of the estimator section, and the comparator circuit, if applicable.

According to an embodiment of the invention, the estimator section is arranged on an integrated circuit, which in particular further includes the equalizer.

According to an embodiment of the invention, the controller has the form of a programmable microcontroller or computer.

According to an embodiment of the invention, the estimator section and the controller are arranged together on an integrated circuit, and the controller in particular has the form of an integrated state machine.

According to an embodiment of the invention, the at least a part of the equalized pulse amplitude modulation signal relates to one eye of the pulse amplitude modulation signal, to a plurality of eyes of the pulse amplitude modulation signal, or to one or more eyes of a rectified pulse amplitude modulation signal.

According to an embodiment of the invention, the at least a part of the equalized pulse amplitude modulation signal relates to a bottom level or to a top level of an eye of the equalized pulse amplitude modulation signal.

A further aspect of the invention relates to a method for determining optimal equalizer settings for an equalizer for equalizing a pulse amplitude modulation signal, the method comprising: receiving the equalized pulse amplitude modulation signal from the equalizer, and receiving an offset signal, and generating an estimator signal indicative of a percentage of signal levels of the equalized pulse amplitude modulation signal which are larger or smaller than the offset signal. The method comprises: receiving the estimator signal, and generating the offset signal, and generating equalizer settings for the equalizer, wherein the optimal equalizer settings for the equalizer are determined by evaluating the estimator signal for a range of offset signals and for a range of equalizer settings.

According to an embodiment of the invention, evaluating the estimator signal includes determining for each member of a set of estimator signals a distance where the respective estimator signal is within a threshold window, and determining the longest distance for determining the optimal equalizer settings.

According to an embodiment of the invention, the estimator signal originates from respectively charging and discharging a capacitor.

According to an embodiment of the invention, the method further includes: converting the estimator signal into one or more binary signals indicative of if the estimator signal is within a threshold window or not, and receiving and evaluating the binary signals accordingly.

According to an embodiment of the invention, evaluating the estimator signal includes applying a binary search algorithm.

According to an embodiment of the invention, the method further includes: generating equalizer settings for the equalizer which include one or more gains of one or more equalizer taps.

BRIEF DESCRIPTION OF THE DRAWINGS

In the following, advantageous embodiments of the invention will be described with reference to the enclosed drawings. However, neither the drawings nor the description shall be interpreted as limiting the invention.

FIG. 1 shows schematically a device having an estimator section and a controller for determining optimal equalizer settings for an equalizer;

FIG. 1a shows schematically a pulse amplitude modulation signal;

FIG. 1b illustrates the estimator signal generated by the estimator section as a function of the offset signal for the pulse amplitude modulation signal illustrated in FIG. 1a;

FIG. 1c illustrates the equalized pulse amplitude modulation signal generated by the equalizer for different equalizer settings;

FIG. 1d illustrates schematically the estimator signal of the estimator section when receiving the equalized pulse amplitude modulation signal without equalization, with optimal equalization, and with over-equalization;

FIG. 2c illustrates a measured PAM-4 signal corresponding to the PAM-4 signal illustrated in FIG. 2a;

Figure 2B:
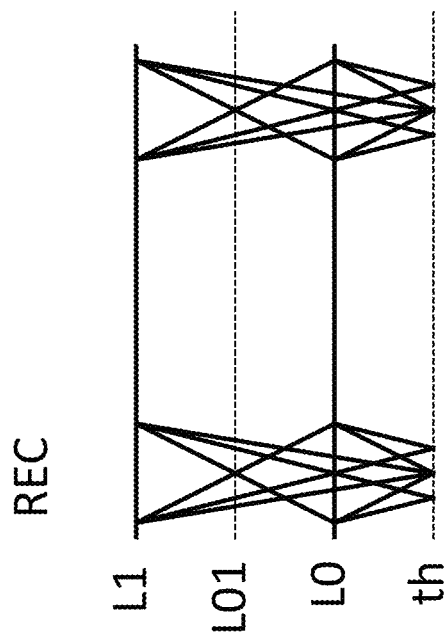
FIG. 2b illustrates a rectified signal of the pulse amplitude modulation signal PAM-4 with respect to a threshold.

The figures are only schematic and not to scale. Same reference signs refer to same or similar features.

MODE(S) FOR CARRYING OUT THE INVENTION

FIG. 1 shows schematically a device 2 for determining optimal equalizer settings setE_opt for an equalizer 1 which is configured for receiving a pulse amplitude modulation signal L0, L1, L2, L3, and which is configured for generating an equalized pulse amplitude modulation signal L0', L1', L2', L3' in accordance with equalizer settings setE of the equalizer 1. In some embodiments, the equalizer settings setE include one or more gains for one or more taps of the equalizer 1. For example, the equalizer settings setE may relate to one or more gains of the equalizer 1 at specific frequencies Determining the binary data stream from the pulse amplitude modulation signal L0, L1, L2, L3 may result in a bit error rate of $10^{-3}$. Determining the binary data stream from the equalized pulse amplitude modulation signal L0', L1', L2', L3' may result in a bit error rate of $10^{-8}$, of $10^{-12}$, etc. Thus, the bit error rate may be improved by five, nine, etc. orders of magnitude. Determining optimal equalizer settings setE_opt for the equalizer 1 is therefore highly important.

As will be discussed in more detail below, a pulse amplitude modulation signal L0, L1, L2, L3 may relate to a NRZ signal having two signal levels L0, L1, to a PAM-4 signal having four signal levels L0, L1, L2, L3, to a rectified PAM-4 signal having two signal levels L0, L1, to one eye E01, E12, E23 including signal levels L0, L1; L1, L2; L2, L3 of the pulse amplitude modulation signal L0, L1, L2, L3, etc.

FIG. 1a shows schematically a pulse amplitude modulation signal L0, L1. The signal levels L0, L1 represent bits of a binary data stream having 0s and 1s. For example, signal level L0 represents data bits 0 and signal level L1 represents data bits 1 of the binary data stream. For example, the signal levels L0, L1 may relate to voltage levels −300 millivolts, +300 millivolts, voltage levels −500 millivolts, +500 millivolts, etc. The pulse amplitude modulation signal L0, L1 may have baud rates of 28 GBd/s, 56 GBd/s, etc. Thus, the duration illustrated in FIG. 1a may be 36 ps, 18 ps, etc. As illustrated in FIG. 1a, the pulse amplitude modulation signal L0, L1 has low frequency parts l and high frequency parts h, which result from low pass effects in the respective data transmission system. The low frequency parts l result from bit sequences of the binary data stream with infrequent transition between 0 and 1, because for long trains of 0s or 1s, the respective signal level L0, L1 are precisely reached. The high frequency parts h result from bit sequences of the binary data stream with frequent transition between 0 and 1, because of sequences of the binary data stream changing frequently between 0 and 1, respective signal level L0, L1 are reached only imprecisely because of low pass filter effects. The high frequency parts h and the low frequency parts l illustrated in FIG. 1a form an envelope of the pulse amplitude modulation signal L0, L1. As illustrated in FIG. 1a, the high frequency parts h reduce the size of an eye E of the pulse amplitude modulation signal L0, L1, wherein the eye E is smaller for data transmission systems having stronger low pass filter effects, and wherein the eye E is larger for data transmission systems with boosted high frequency components.

As illustrated in FIG. 1, the device 2 for determining the optimal equalizer settings setE_opt for the equalizer 1 includes an estimator section 21 and a controller 22.

The estimator section 21 is configured for receiving the equalized pulse amplitude modulation signal L0', L1' from the equalizer 1, and for receiving an offset signal offS, and for generating an estimator signal estS indicative of the percentage of signal levels of the equalized pulse amplitude modulation signal L0', L1' which are larger or smaller than the offset signal offS. For example, the estimator section 21 is configured for generating the estimator signal estS by performing an addition operation for signal levels of the equalized pulse amplitude modulation signal L0', L1' which are larger than the offset signal offS, and by performing a subtraction operation for signal levels of the equalized pulse amplitude modulation signal L0', L1' which are less than the offset signal offS. For example, the estimator section 21 is configured for generating the estimator signal estS by incrementing a counter for signal levels of the equalized pulse amplitude modulation signal L0', L1' which are larger than the offset signal offS, and by decrementing a counter for signal levels of the equalized pulse amplitude modulation signal L0', L1' which are less than the offset signal offS. For example, the estimator signal estS is indicative of the percentage Ngt/(Ngt+Nlt), wherein for a predefined time period Ngt is the number of signal levels of the equalized pulse amplitude modulation signal L0', L1' which are greater than the offset signal offS, and Nlt is the number of signal levels of the equalized pulse amplitude modulation signal L0', L1' which are less than the offset signal offS.

As illustrated in FIG. 1a, intermediate level L01 is between the signal level L0 and the signal level L1 of the pulse amplitude modulation signal L0, L1. For example, level L01 is half of the difference of levels L0, L1, such as 0 volts. The offset signal offS is defined with respect to level L01. A first offset signal o1 is smaller than the high frequency part h of signal level L0 and larger than the low frequency part of signal level L0, a second offset signal o2 is smaller than the intermediate level L01 and larger than the high frequency part h of signal level L0, a third offset signal o3 is smaller than the high frequency part h of signal level L1 and larger than the intermediate level L01, a fourth offset signal o4 is smaller than the low frequency part of signal level L1 and larger than the high frequency part h of signal level L1, etc. For example, the first and second offset signals o1, o2 have negative values, and the third and fourth offset signals o3, o4 have positive values.

In some embodiments of the invention, the pulse amplitude modulation signal L0, L1 originates from a random bit stream having an equal number of 0s and 1s, wherein the pulse amplitude modulation signal L0, L1 has an average signal level of intermediate level L01, for example 0 volts, and a broad frequency spectrum with the effect that because of low pass effects in the respective data transmission system, the eye E of the pulse amplitude modulation signal L0, L1 has a reduced size.

In accordance with some embodiments of the invention, FIG. 1b illustrates the estimator signal estS generated by the estimator section 21 as a function of the offset signal offS for the pulse amplitude modulation signal L0, L1 illustrated in FIG. 1a originating from a random bit stream having an equal number of 0s and 1s, wherein the signal level L0 and signal level L1 occur an equal number of times, and wherein the estimator signal estS is indicative of the percentage of signal levels of the pulse amplitude modulation signal L0, L1 which are larger than the offset signal offS. For offset signals offS close to zero and for offset signals offS within the eye E, such as offset signals o2, o3, the estimator signal estS indicates that the percentage of signal levels of the pulse amplitude modulation signal L0, L1 which are larger than the offset signal offS is close to 50%. Within the envelope of the high frequency part h and the low frequency part l of signal level L0, such as for offset signal o1, the pulse amplitude modulation signal L0, L1 is more often larger than the offset signal o1 and the estimator signal estS indicates a percentage which is larger than 50%. Within the envelope of the high frequency part h and the low frequency part l of signal level L1, such as for offset signal o4, the pulse amplitude modulation signal L0, L1 is more often smaller than the offset signal o4 and the estimator signal estS indicates a percentage which is smaller than 50%. At low frequency part l of signal level L0, the pulse amplitude modulation signal L0, L1 is essentially always larger than the offset signal offS and the estimator signal estS indicates a percentage which is essentially 100%. At low frequency part l of signal level L1, the pulse amplitude modulation signal L0, L1 is essentially always smaller than the offset signal offS and the estimator signal estS indicates a percentage which is essentially 0%.

In accordance with some embodiments of the invention, FIG. 1c illustrates the equalized pulse amplitude modulation signal L0', L1' generated by the equalizer 1 for different equalizer settings setE0, setE_opt, setE2. On the left, the case is illustrated for equalizer settings setE0 which have no equalization effect, wherein the pulse amplitude modulation signal L0, L1 received by the equalizer 1 and the equalized pulse amplitude modulation signal L0', L1' generated by the equalizer 1 are identical, and wherein the eye E0 has a reduced size because of low pass effects of the data transmission system generating the pulse amplitude modulation signal L0, L1, and wherein the size of the eye E0 results from the high frequency parts h0. In the middle, the case is illustrated for optimal equalizer settings setE_opt, wherein the eye E_opt of the equalized pulse amplitude modulation signal L0', L1' has an optimal size because of a smaller difference between the high frequency parts h_opt and the low frequency parts l of the equalized pulse amplitude signal L0', L1' than in the case without equalization, and wherein the size of the eye E_opt results from the high frequency parts h_opt. On the right, the case is illustrated for equalizer settings setE2 which result in over-equalization, wherein the high frequency parts h2 of the equalized pulse amplitude signal L0', L1' are smaller respectively larger than the low frequency parts l, and wherein the size of the eye E2 results from the low frequency parts l.

In accordance with some embodiments of the invention, FIG. 1d illustrates schematically the estimator signal estS of the estimator section 21 when receiving the equalized pulse amplitude modulation signal L0', L1' without equalization (equalizer settings setE0), with optimal equalization (equalizer settings setE_opt), and with over-equalization (equalizer settings setE2). For offset signals around L01, the estimator signal estS0 without equalization deviates earlier from the percentage of 50% than the estimator signal estS_opt with optimal equalization, and the estimator signal est2 with over equalization deviates later from the percentage of 50% than the estimator signal estS_opt with optimal equalization. The signals estS0, estS_opt, estS2 reach the percentage of 100% respectively 0% as strictly monotonic functions for small respectively large offset signals omin, omax.

As illustrated in FIG. 1, the device 2 includes a controller 22 for receiving the estimator signal estS generated by the estimator section 21, and for generating the offset signal offS, and for generating equalizer settings setE for the equalizer 1. The controller 22 is configured for receiving the estimator signals estS0, estS_opt, estS2 illustrated in FIG. 1d by generating respective offset signals offS and equalizer settings setE0, estS_opt, estS2. The controller 22 is further configured for recording the received estimator signals estS0, estS_opt, estS2. The controller 22 is configured for defining a threshold window +−estSth, which will be described in more detail below. Good results are achieved for threshold windows +−estSth in the order of +−5%, or of +−10%, or of +−15%. As will be described in more detail below, the controller 2 includes an optimizer 221 for identifying in the estimator signals estS0, estS_opt, estS2 distances d0, d_opt, d2 with respect to the threshold window +−estSth, which distances d0, d_opt, d2 are defined as the distances where the respective estimator signal estS0, estS_opt, estS2 remains within the threshold window +−estSth.

The distance d0 results from equalizer settings setE0 without equalization. The distance d_opt results from equalizer settings setE_opt with optimal equalization. The distance d2 results from equalizer settings setE2 with over-equalization. The controller 22 is configured to select the longest of the distances d0, d_opt, d2, which is d_opt, and to determine the respective equalizer settings as the optimal equalizer settings, which is setE_opt.

This example relates to three equalizer settings estS0, estS_opt, estS2. It is clear that the controller 22 may be configured to generate more than three different equalizer settings setE0, setE_opt, setE2 for recording more than three estimator signals estS0, estS_opt, estS2, for identifying more than three distances d0, d_opt, d2, and for selecting the longest distance from more than three distances d0, d_opt, d2.

According to some embodiments of the invention, the controller 22 generates a range of offset signals offS, such as omin, o1, o2, L01, o3, o4, omax, and a range of equalizer settings setE, such as setE0, setE_opt, setE2. The range of offset signals offS may relate to a continuous range. The range of equalizer settings setE may relate to a discrete range. The range of offset signals offS and the range of equalizer settings setE may form a domain.

In some embodiments of the invention, the controller 22 has the form of a programmable microcontroller, a programmable computer, etc., wherein one or more processors are configured for executing stored program instructions for providing the functions as described herein, such as identifying the distances d0, d_opt, d2, determining the optimal equalizer settings setE_opt, etc. The controller 22 includes voltage sources for providing the offset signal offS for the estimator section 21, signal lines for providing equalizer settings for the equalizer 1, etc., which are controlled in accordance to stored program instructions.

In some embodiments of the invention, the controller 22 is arranged at least partially on an integrated circuit which includes logic circuits for executing the functions as described. In particular, the integrated circuit may include an integrated state machine.

Other terminology for an integrated circuit may include IC, chip, microchip, etc.

In some embodiments of the invention, the equalizer 1 and the estimator section 21 are at least partially arranged together on an integrated circuit.

In some embodiments of the invention, the device 2 for determining the optimal equalizer settings of an equalizer 1 is at least partially arranged on an integrated circuit, and thus the estimator section 21 and the controller 22 are at least partially arranged on the same integrated circuit. In some embodiments of the invention, the device 2 for determining the optimal settings of an equalizer 1 and the equalizer 1 are arranged at least partially on the same integrated circuit.

Thus, the equalizer 1 and the estimator section 21 may be arranged together on an integrated circuit. The controller 22 may be in the form of a microcontroller or computer separated from this integrated circuit, or the integrated circuit may have further arranged the controller 22 for example in the form of an integrated state machine.

Figure 2C:
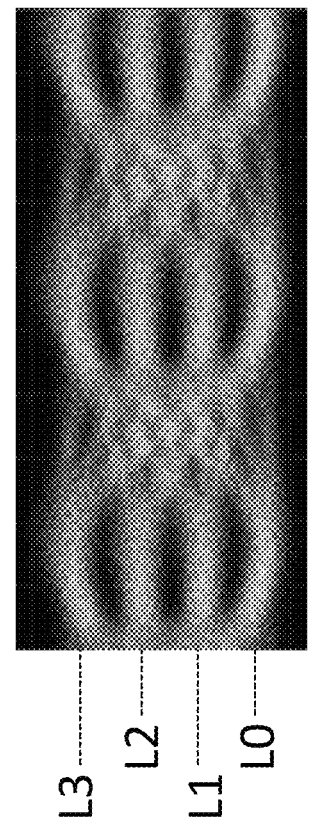
Figure 2A:
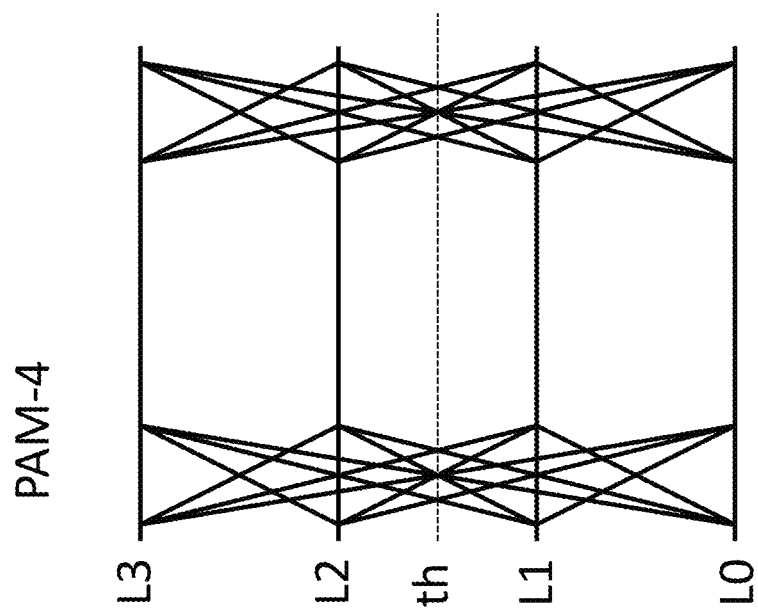
FIG. 2a illustrates four signal levels of a PAM-4 pulse amplitude modulation signal.

FIG. 2a illustrates four signal levels L0, L1, L2, L3 of a PAM-4 pulse amplitude modulation signal. Depending on the bit stream, the signal levels may or may not change from any one of the signal levels L0, L1, L2, L3 to any other one of the signal levels L0, L1, L2, L3. For the purpose of clarity, low pass effects are not illustrated in FIG. 2a.

FIG. 2b illustrates a rectified signal REC of the pulse amplitude modulation signal PAM-4 with respect to a threshold th (see FIG. 2a) as disclosed in U.S. Ser. No. 10/594,523 B2, which is hereby incorporated by reference. The rectified signal REC may be received by the equalizer 1 for generating an equalized signal in order to compensate for low pass effects, in accordance with optimal equalizer settings setE_opt. The rectified signal REC has signal levels L0, L1. As a result of rectification, the rectified signal REC is asymmetric with respect to intermediate level L01.

FIG. 2c illustrates a measured PAM-4 signal corresponding to the PAM-4 signal illustrated in FIG. 2a. The PAM-4 signal has four signal levels L0, L1, L2, L3.

Figure 3A:
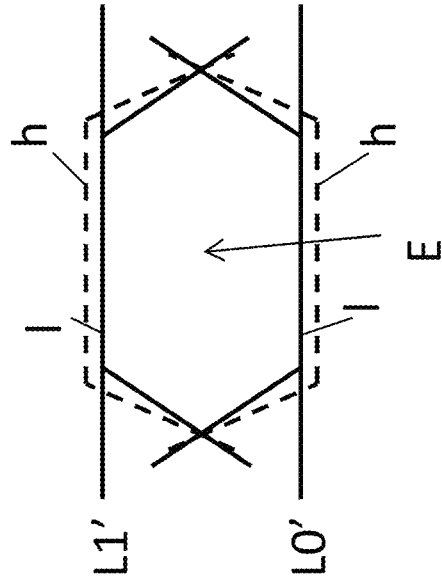
FIGS. 3aa, 3ab illustrate schematically over-equalization in case of a NRZ signal.

FIGS. 3aa, 3ab illustrate schematically over-equalization in case of a NRZ signal. FIG. 3aa illustrates the pulse amplitude modulation signal L0, L1 received by the equalizer 1. FIG. 3ab illustrates the pulse amplitude modulation signal L0', L1' generated by the equalizer 1, wherein the high frequency parts are over-equalized.

Figure 3B:
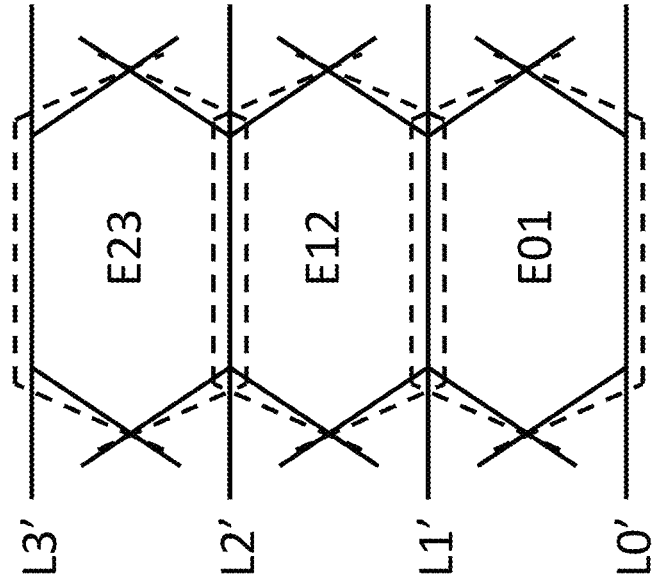
FIG. 3ba, 3bb illustrate schematically over-equalization in case of a PAM-4 signal.
Figure 3A:
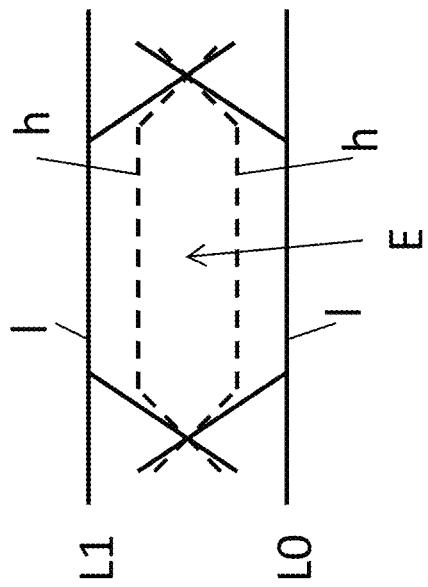
Figure 3B:
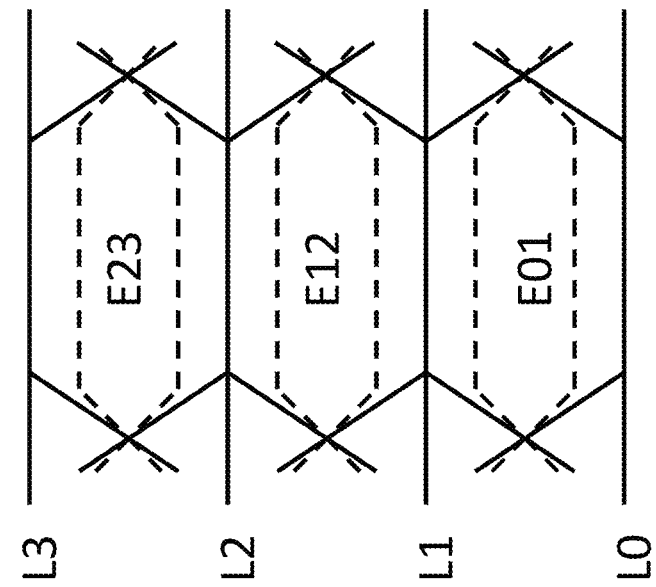

FIG. 3ba, 3bb illustrate schematically over-equalization in case of a PAM-4 signal. FIG. 3ba illustrates schematically the pulse amplitude modulation signal L0, L1, L2, L3 received by the equalizer 1. The PAM-4 signal has a lower eye E01 between signal levels L0, L1, a middle eye E12 between signal levels L1, L2, and an upper eye E23 between signal levels L2, L3. FIG. 3bb illustrates the pulse amplitude modulation signal L0', L1', L2', L3' generated by the equalizer 1, wherein the high frequency parts are over-equalized thereby closing the eyes E01, E12, E23 of neighbors. Thus, as illustrated in FIG. 3bb, the upper eye E23 has a reduced size compared to the eye E illustrated in FIG. 3ab because the lower part of the upper eye E23 becomes partly covered by over-equalized high frequency parts relating to middle eye E12. Similarly, the upper and lower parts of the middle eye E12 become partly covered by over-equalized high frequency parts relating to the upper eye E23 respectively the lower eye E01, and the upper part of the lower eye E01 becomes partly covered by over-equalized high frequency parts relating to the middle eye E12.

Figure 4B:
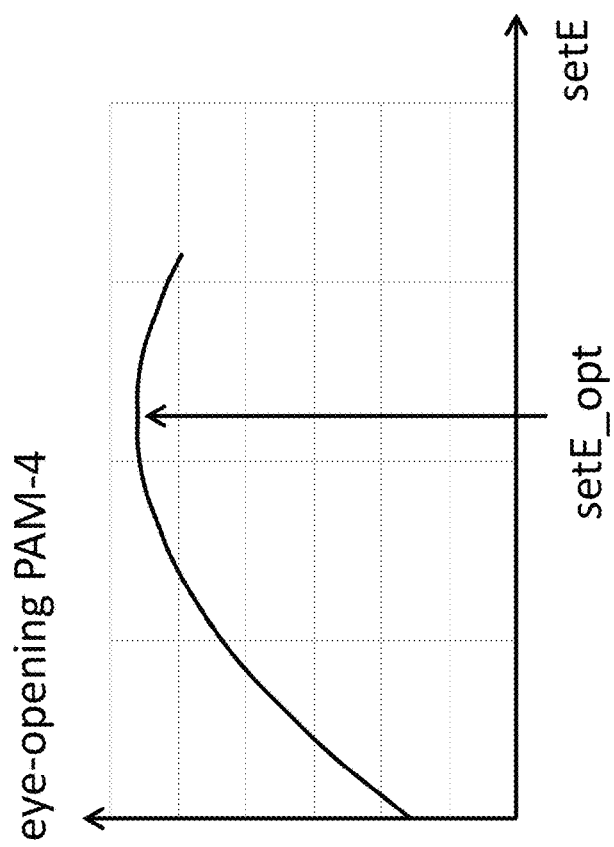
FIG. 4a, 4b illustrate schematically the eye-opening of the pulse amplitude modulation signal as a function of the equalizer settings.
Figure 4A:
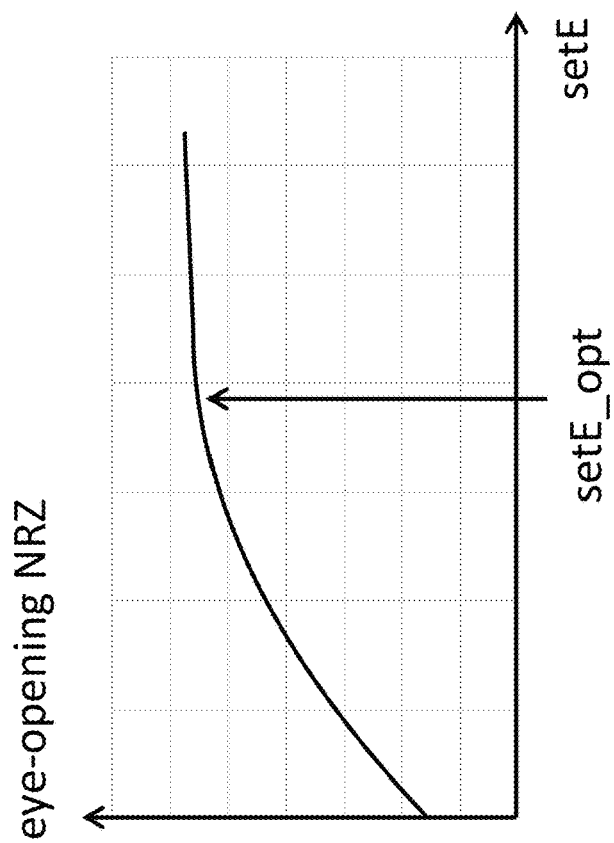

FIG. 4a, 4b illustrate schematically the eye-opening of the pulse amplitude modulation signal as a function of the equalizer settings setE. FIG. 4a relates to case of the eye E of a NRZ signal as illustrated in FIG. 3aa, 3ab. FIG. 4b relates to the case of the eye E23 of a PAM-4 signal as illustrated in FIG. 3ba, 3bb. FIG. 4a illustrates a first approximation of the eye opening, which may not apply for equalizer settings setE above a certain limit.

As illustrated in FIG. 4a, the eye-opening of the eye E increases with increasing equalizer settings setE, but no longer increases after a certain point. At that point, which relates to the optimal equalizer settings setE_opt, the low frequency parts l and the high frequency parts h essentially overly each other. Even if the equalizer settings setE are increased further, the eye-opening does no longer increase, because after that point the eye-opening is defined by the low frequency parts l.

As illustrated in FIG. 4b, the eye-opening of the eye E23 increases with increasing equalizer settings setE, and after a certain point decreases, because of the high frequency parts h of the adjacent eye E12 of the PAM-4 signal, which "snow" into the eye E23. Thus, the eye-opening reaches a maximum at the optimal equalizer settings setE_opt.

Figure 5B:
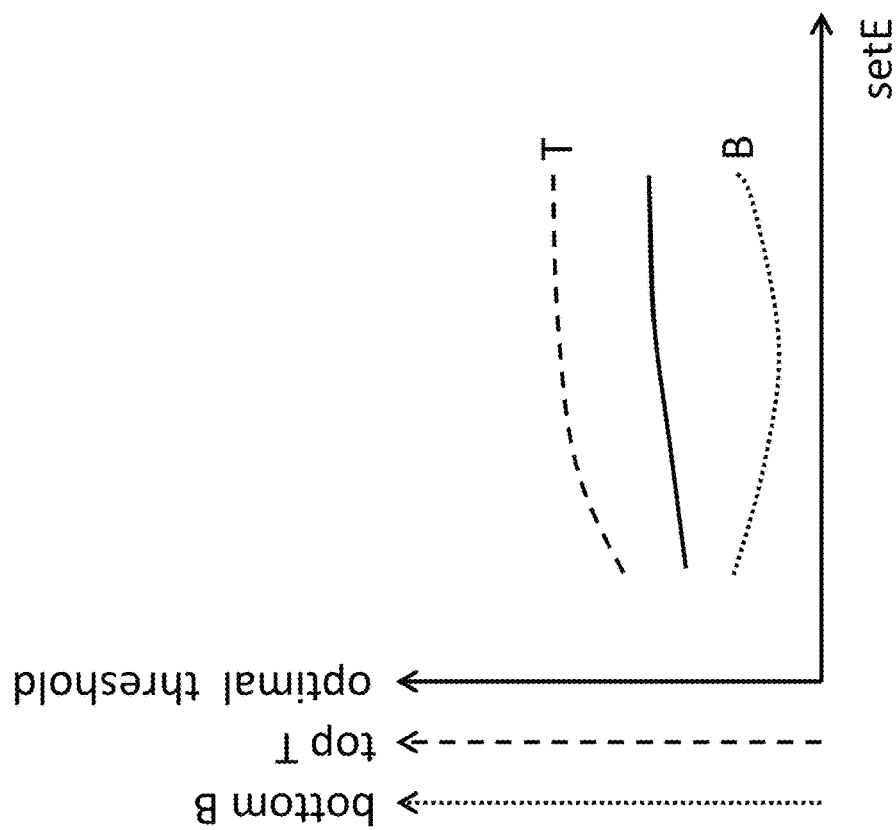
FIG. 5b illustrates schematically the edges of the eye already illustrated in FIG. 5a, and the optimal detection threshold as a function of the equalizer settings setE.
Figure 5A:
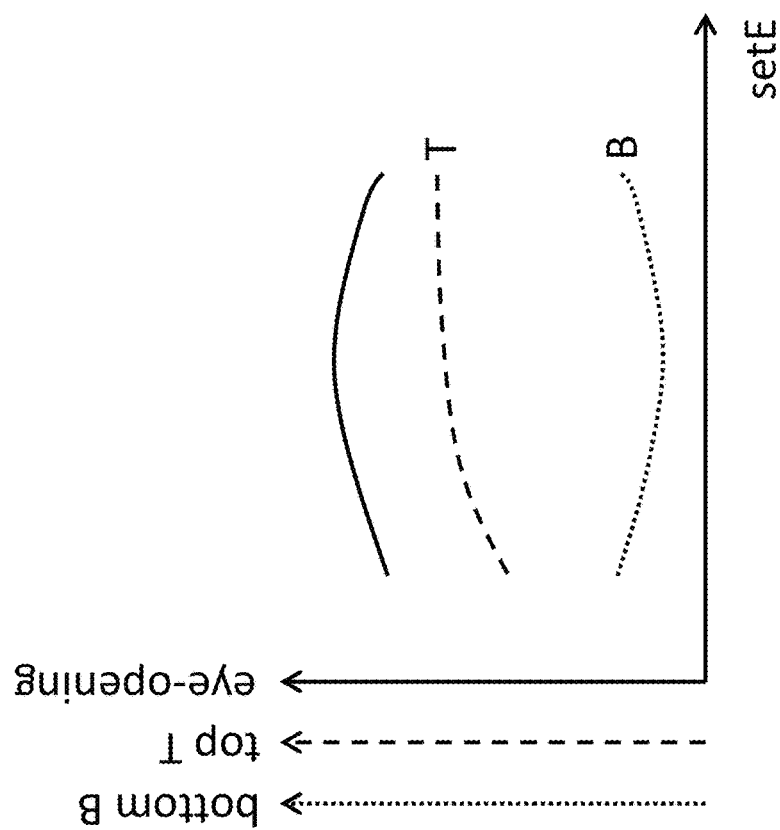
FIG. 5a illustrates schematically the edge of the top eye of the PAM-4 signal illustrated in FIG. 3aa, 3ab at the bottom and the top, and the eye-opening of the top eye as a function of the equalizer settings.

FIG. 5a illustrates schematically the edge of the top eye E23 of the PAM-4 signal illustrated in FIG. 3aa, 3ab at the bottom and the top, and the eye-opening of the top eye E23 as a function of the equalizer settings setE. At the bottom, the high frequency parts h decrease with increasing equalizer settings setE, and the edge of the eye E23 decrease. At a certain point, the edge of the eye E23 starts to increase because of high frequency parts h of the adjacent eye E12 "snowing" into the eye E23. At the top, the edge of the eye E23 increases with increasing equalizer settings setE, because of increased equalization of the high frequency parts h. At a certain point, the edge no longer increases, because of being defined by the low frequency parts l. The eye-opening of the eye E23, which is defined by the distance between the edge at the bottom and the edge at the top, increases with increasing equalizer settings setE until a certain point, and the decreases because of a decreasing distance between the edge at the bottom and the top, as described earlier in connection with FIG. 4b.

FIG. 5b illustrates schematically the edges of the eye E23 already illustrated in FIG. 5a and the optimal detection threshold as a function of the equalizer settings setE. The optimal detection threshold is the middle between the edge at the bottom and the edge at the top.

The present invention is equally well applicable for pulse amplitude modulation signals PAM-4 as illustrated in FIG. 2a, or for rectified signals REC as illustrated in FIG. 2b.

Figure 6:
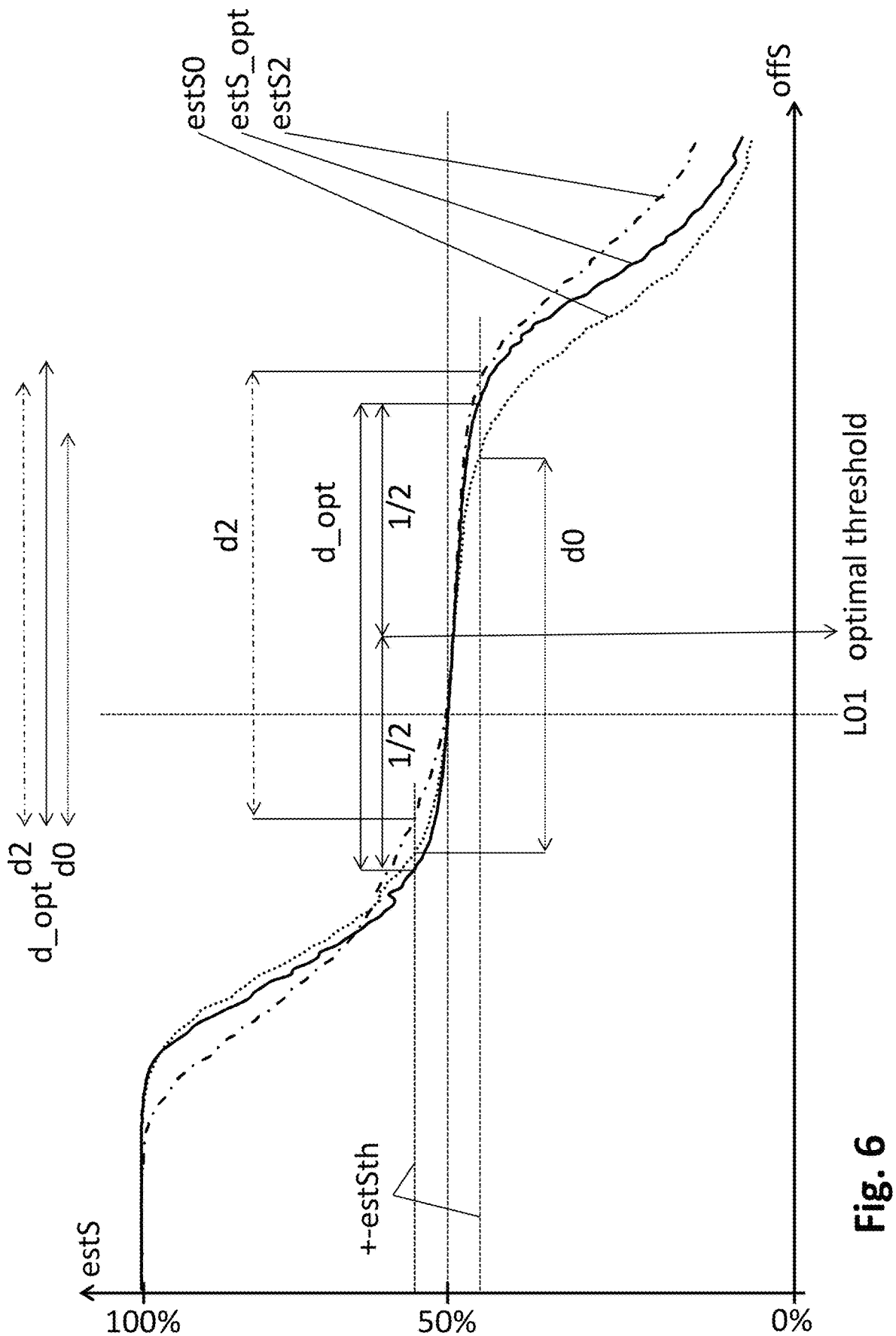
FIG. 6 illustrates schematically estimator signals resulting from measurements of a rectified signal as illustrated in FIG. 2b.

FIG. 6 illustrates estimator signals estS0, estS_opt, estS2 resulting from measurements of a rectified signal REC as illustrated in FIG. 2b. Because of the effects described in connection with FIGS. 3aa, 3ab, 4b, 5a, the estimator signals estS0, estS_opt, estS2 are as follows. At offset signal offs=L01, the estimator signals estS0, estS_opt, estS2 are at 50%. For smaller offset signals offS<L01, the estimator signal estS0 (setE0 without equalization) increases faster than the offset signal offS_opt, and the offset signal offS2 (setE2 with over-equalization) increases faster than the other two, but then crosses the other two because of a slower increase as a result of high frequency parts of the eye E12 "snowing" into the eye E23 (from the bottom) and into the eye E01 (from the top). For larger offset signals offS>L01, the estimator signals behave similarly, wherein estS0 has the fastest decrease because no equalization has the result of a reduced eye-opening when compared to estS_opt, and because estS2 has the slowest decrease because over-equalization has the result of an enlarged eye-opening when compared to estS_opt. The shape of the estimator signals estS0, estS_opt, estS2 is further a result of the fact that the rectified signal REC is an asymmetric signal.

As illustrated in FIG. 6, the distances d0, d_opt, d2 described earlier can be clearly identified for the purpose of determining optimal equalizer settings setE_opt. Furthermore, the controller 22 may be further configured for determining an optimal detection threshold. As illustrated in FIG. 4, the optimal detection threshold is in the center of the distance d_opt.

Figure 7:
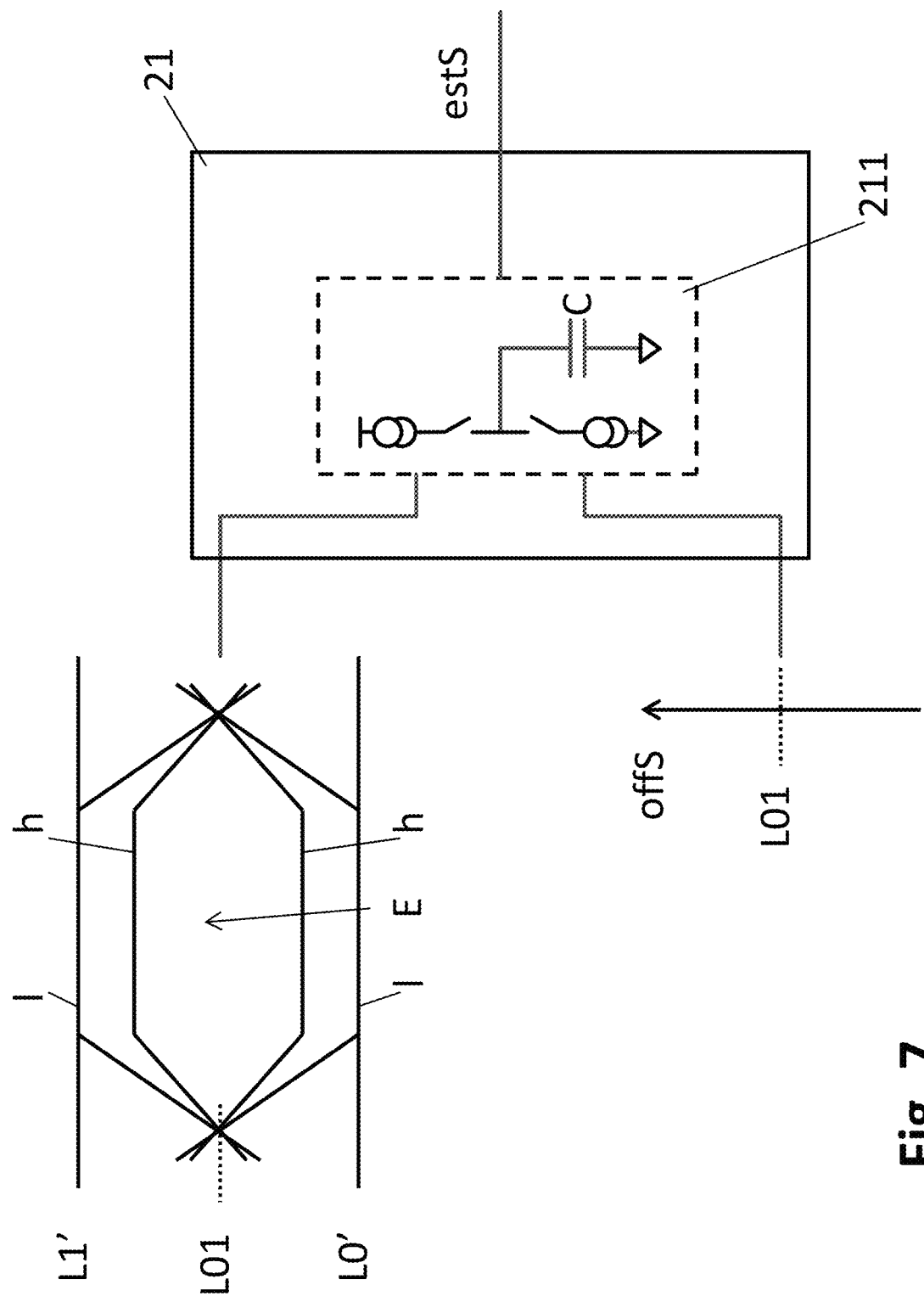
FIG. 7 illustrates an embodiment of the estimator section.

FIG. 7 illustrates an embodiment of the estimator section 21 in accordance with some embodiments of the invention. The estimator section 21 includes a charge pump circuit 211 for charging a capacitor C in accordance with the pulse amplitude modulation signal L0', L1' and the offset signal offS. As illustrated in FIG. 7, the charge pump may include two current sources and two switches, which are closed and opened alternatively. In case the pulse amplitude modulation signal L0', L1' is greater than the offset signal offS, a switch is closed at one of the current sources for charging the capacitor C. In case the pulse amplitude modulation signal L0', L1' is less than the offset signal offS, a switch is closed at the other one of the current sources for discharging the capacitor C. The estimator section 21 may include an amplifier or a buffer for amplifying or buffering the estimator signal estS at capacitor C in order to compensate for load effects by the controller 22, which receives the estimator signal estS generated by the estimator section 21.

Figure 7A:
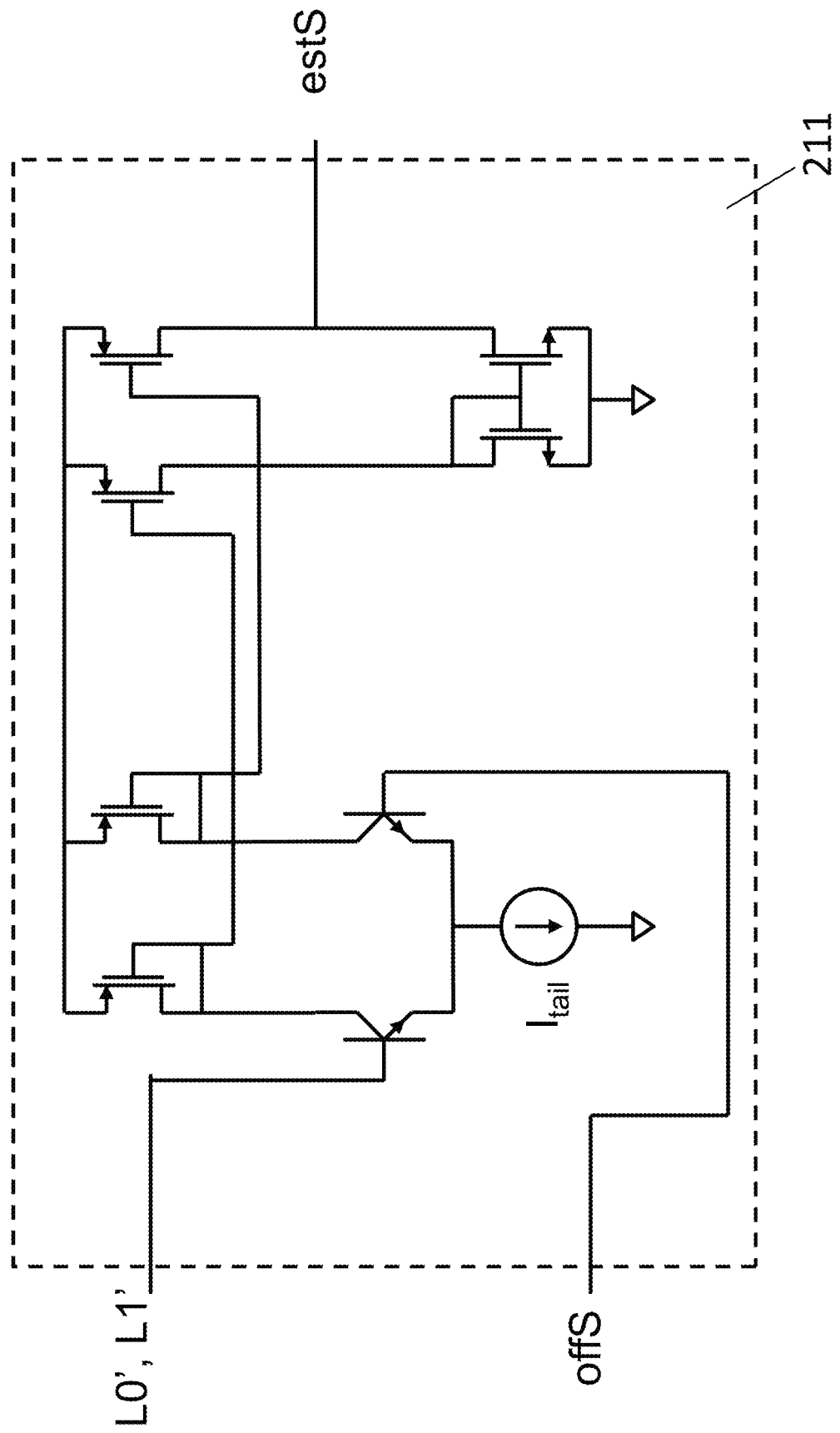
FIG. 7a illustrates electronic circuits providing a charge pump circuit of the estimator section.

FIG. 7a illustrates electronic circuits providing a charge pump circuit 211 of the estimator section 21 in accordance with some embodiments of the invention.

Figure 8:
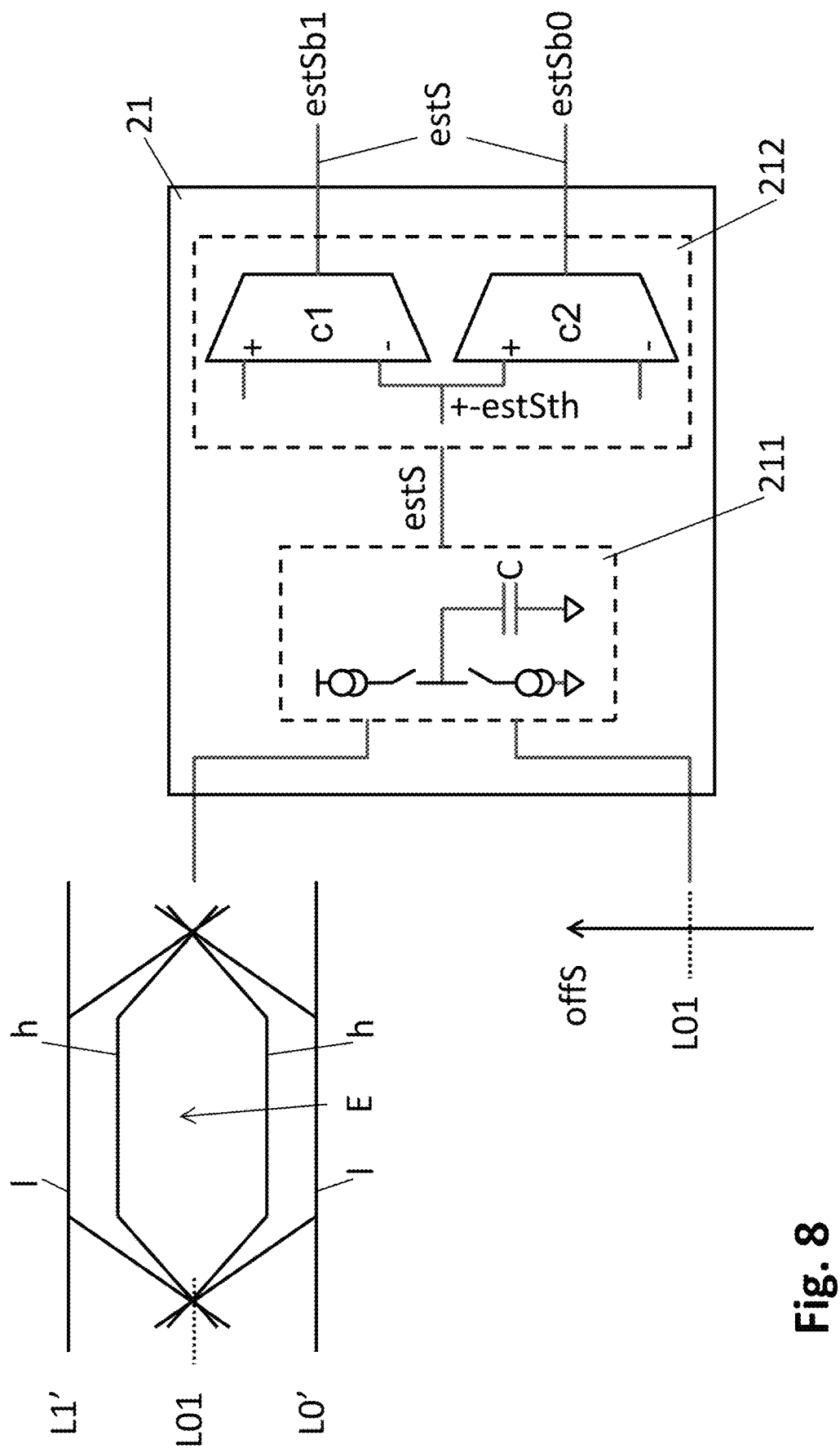
FIG. 8 illustrates an embodiment of the estimator section.

FIG. 8 illustrates an embodiment of the estimator section 21 in accordance with some embodiments of the invention. In contrast to the estimator section 21 illustrated in FIG. 7, the estimator section 21 of FIG. 8 further includes a comparator circuit 212 for determining if the estimator signal estS is within or outside the threshold window +−estSth. The comparator circuit 212 generates one or more respective binary signals estSb0, estSb1. The controller 22 is configured for processing the one or more binary signals estSb0, estSb1 accordingly.

Figure 8A:
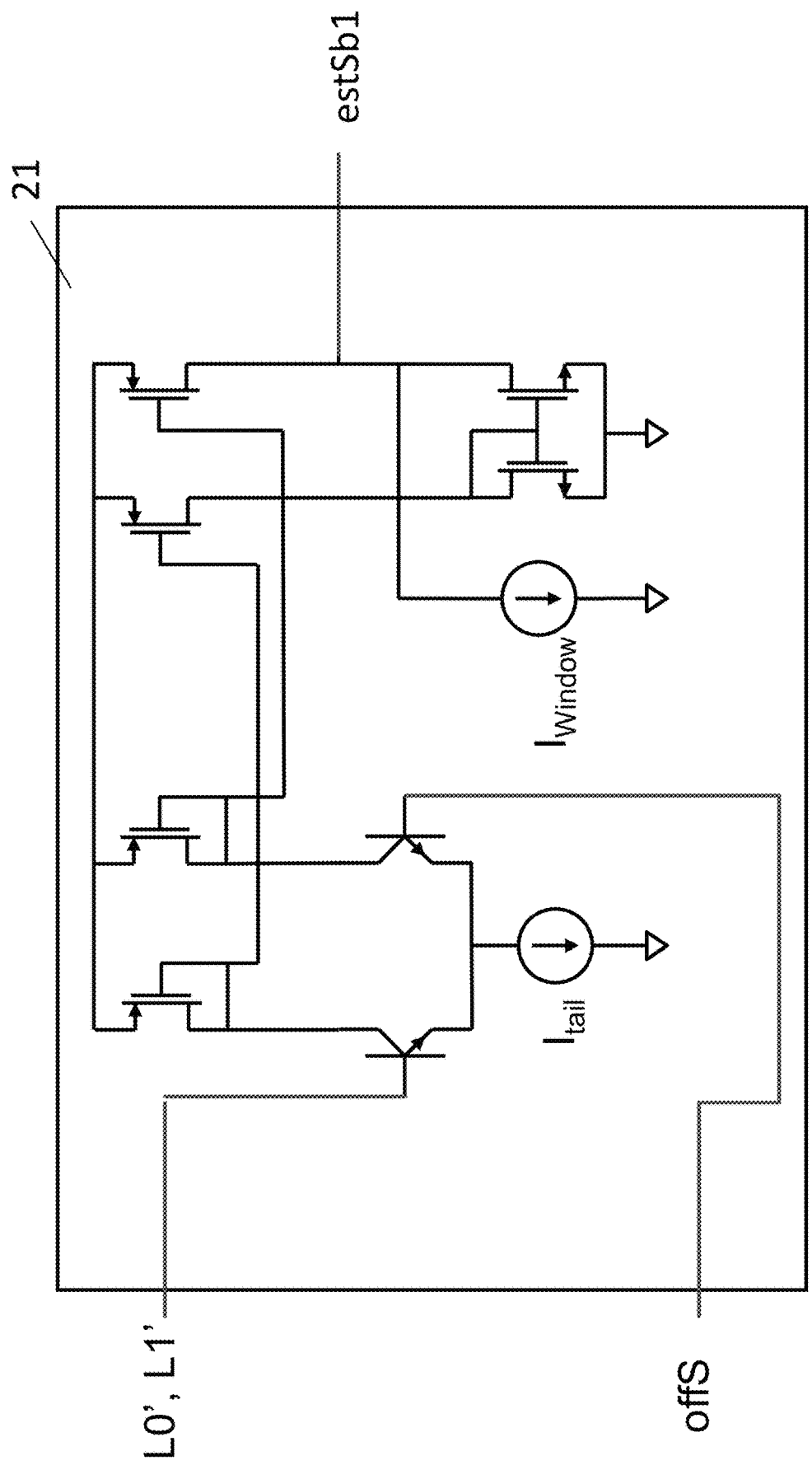
FIG. 8a illustrates electronic circuits providing an estimator section.

FIG. 8a illustrates electronic circuits providing an estimator section 21 in accordance with some embodiments of the invention. The estimator section 21 illustrated in FIG. 8a is configured for generating one binary signal estSb1 illustrated in FIG. 8. For generating the further binary signal estSb0 illustrated in FIG. 8, the estimator section 21 further includes an inverted circuit configuration, which is not illustrated in FIG. 8a.

Figure 9:
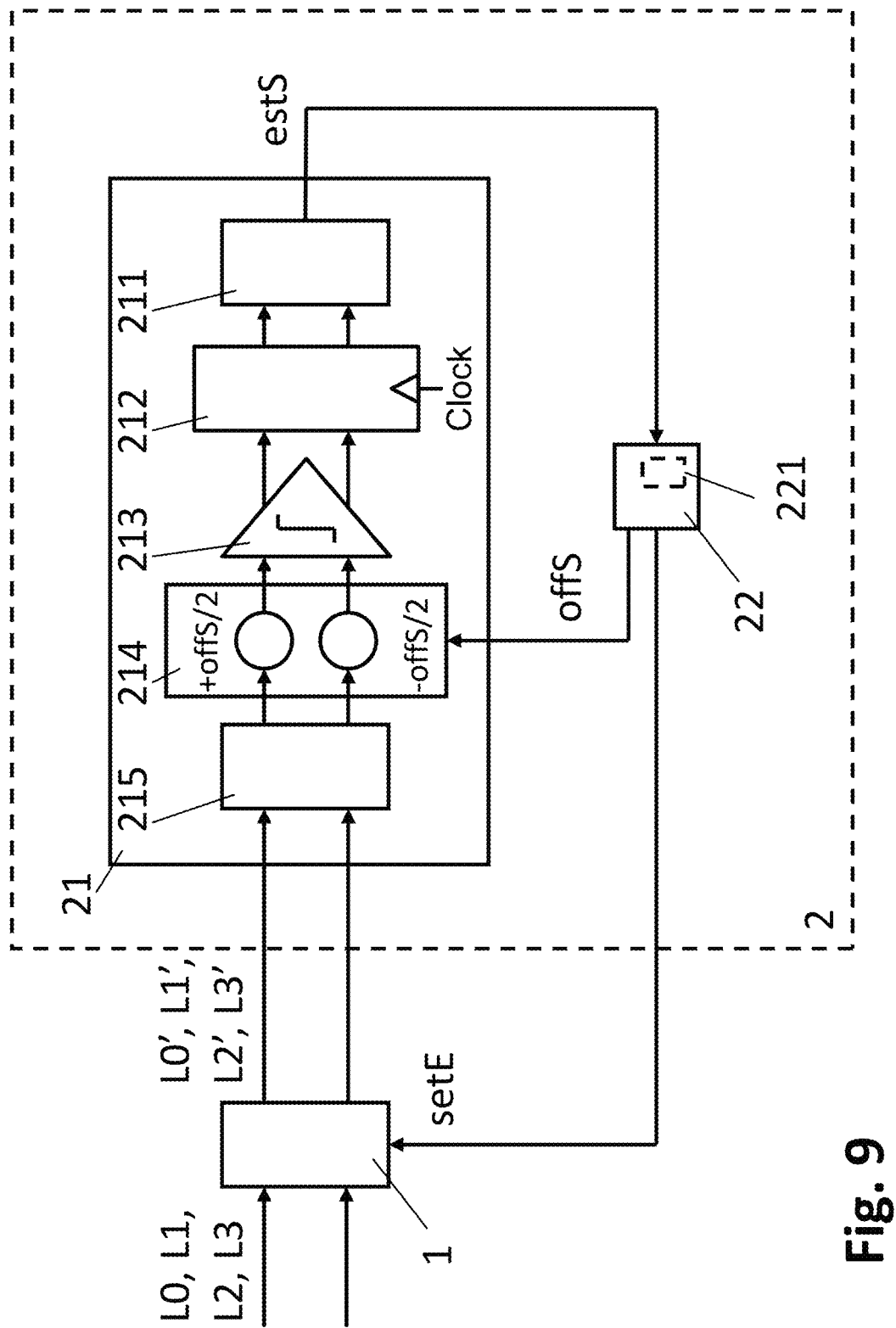
FIG. 9 illustrates a device for determining optimal equalizer settings for an equalizer for equalizing a pulse amplitude modulation signal.

In accordance with some embodiments of the invention, FIG. 9 illustrates a device 2 for determining optimal equalizer settings setE_opt for an equalizer 1 for equalizing a pulse amplitude modulation signal L0, L1, L2, L3. FIG. 9 is a differential illustration. The estimator section 21 includes an input stage 215 for selecting an eye of the pulse amplitude modulation signal L0, L1, L2, L3 or for rectifying the pulse amplitude modulation signal L0, L1, L2, L3. The input stage 215 is followed by an offset stage 214 for adding respectively subtracting half of the offset signals +offS/2, −offS/2. The offset stage 214 is followed by a digitizer 213 providing a high gain. The digitizer 213 is followed by a re-timer 212 such as in the form of a flip-flop for taking into account duty cycle distortion. The re-timer 212 is followed by a charge pump 211 as described earlier for counting the number of 1's and 0's.

The invention claimed is:

1. A device for determining equalizer settings for an equalizer for equalizing a pulse amplitude modulation signal, the device comprising:
    an estimator section configured for receiving at least a part of an equalized pulse amplitude modulation signal from the equalizer, and for receiving an offset signal, and for generating an estimator signal indicative of a percentage of signal levels of the at least a part of the equalized pulse amplitude modulation signal which are larger than the offset signal; and
    a controller configured for receiving the estimator signal, and for generating the offset signal, and for generating equalizer settings for the equalizer, wherein the controller includes an optimizer for determining the equalizer settings for the equalizer by evaluating the estimator signal for a range of offset signals and for a range of equalizer settings.

2. The device of claim 1, wherein the controller is configured for evaluating the estimator signal, which includes determining, for each member of a set of estimator signals, a distance where the respective estimator signal is within a threshold window, and determining the longest distance for determining the equalizer settings.

3. The device of claim 1, wherein the estimator section includes a charge pump circuit for respectively charging and discharging a capacitor.

4. The device of claim 1, wherein the estimator section includes a comparator circuit for converting the estimator signal into one or more binary signals indicative of if the estimator signal is within a threshold window or not, wherein the controller is configured for receiving and evaluating the binary signals accordingly.

5. The device of claim 4, wherein the optimizer is configured for evaluating the one or more binary signals by applying one or more binary search algorithms.

6. The device of claim 1, wherein the controller is configured for generating equalizer settings for the equalizer which include one or more gains of one or more equalizer taps.

7. The device of claim 1, wherein the device includes one or more components which are arranged on an integrated circuit, in particular one or more of the estimator section, and a comparator circuit, if applicable.

8. The device of claim 1, wherein the estimator section is arranged on an integrated circuit, which in particular further includes the equalizer.

9. The device of claim 1, wherein the controller is a programmable microcontroller or computer.

10. The device of claim 1, wherein the estimator section and the controller are arranged together on an integrated circuit, and wherein the controller in particular has the form of an integrated state machine.

11. The device of claim 1, wherein the at least a part of the equalized pulse amplitude modulation signal relates to one eye of the pulse amplitude modulation signal, to a plurality of eyes of the pulse amplitude modulation signal, or to one or more eyes of a rectified pulse amplitude modulation signal.

12. The device of claim 1, wherein the at least a part of the equalized pulse amplitude modulation signal relates to a bottom level or to a top level of an eye of the equalized pulse amplitude modulation signal.

13. A method for determining equalizer settings for an equalizer for equalizing a pulse amplitude modulation signal, the method comprising:
    receiving an equalized pulse amplitude modulation signal from the equalizer, and receiving an offset signal, and generating an estimator signal indicative of a percentage of signal levels of the equalized pulse amplitude modulation signal which are larger than the offset signal,
    receiving the estimator signal, and generating the offset signal, and generating equalizer settings for the equalizer, wherein the equalizer settings for the equalizer are determined by evaluating the estimator signal for a range of offset signals and for a range of equalizer settings.

14. The method of claim 13, wherein evaluating the estimator signal includes determining, for each member of a set of estimator signals, a distance where the respective estimator signal is within a threshold window, and determining the longest distance for determining the equalizer settings.

15. The method of claim 13, wherein the estimator signal originates from respectively charging and discharging a capacitor.

16. The method of claim 13, further including converting the estimator signal into one or more binary signals indicative of if the estimator signal is within a threshold window or not, and receiving and evaluating the binary signals accordingly.

17. The method of claim 13, wherein evaluating the estimator signal includes applying a binary search algorithm.

18. The method of claim 13, further including generating equalizer settings for the equalizer which include one or more gains of one or more equalizer taps.

\* \* \* \* \*